(12) United States Patent
Ogata et al.

(10) Patent No.: US 10,228,115 B2
(45) Date of Patent: Mar. 12, 2019

(54) LIGHTING APPARATUS FOR RAISING NATURAL LAWN GRASS

(71) Applicants: SHOWA DENKO K.K., Tokyo (JP); SEKISHIN DENKI CO., LTD., Tokyo (JP)

(72) Inventors: Hiroshi Ogata, Osaka (JP); Shigetoshi Jogan, Osaka (JP); Kouichi Ishitaka, Osaka (JP)

(73) Assignees: SHOWA DENKO K.K., Tokyo (JP); SEKISHIN DENKI CO., LTD., Tokyo (JP)

( * ) Notice: Subject to any disclaimer, the term of this patent is extended or adjusted under 35 U.S.C. 154(b) by 566 days.

(21) Appl. No.: 15/011,668

(22) Filed: Feb. 1, 2016

(65) Prior Publication Data
US 2017/0051901 A1 Feb. 23, 2017

(30) Foreign Application Priority Data
Aug. 18, 2015 (JP) ................. 2015-160796

(51) Int. Cl.
*F21V 21/22* (2006.01)
*A01G 7/04* (2006.01)
(Continued)

(52) U.S. Cl.
CPC .............. *F21V 21/22* (2013.01); *A01G 7/045* (2013.01); *A01G 20/30* (2018.02); *F21Y 2115/10* (2016.08); *Y02P 60/149* (2015.11)

(58) Field of Classification Search
CPC ......... F21V 21/22; F21V 21/06; A01G 20/30; A01G 7/045; A01G 9/20; A01G 7/04;
(Continued)

(56) References Cited

U.S. PATENT DOCUMENTS 9,307,703 B2 * 4/2016 Berghoff .................. A01G 7/04
2001/0035468 A1 * 11/2001 Santa Cruz ............ A01G 7/045
  239/726
2011/0099895 A1 5/2011 Berghoff et al.

FOREIGN PATENT DOCUMENTS

DE  102008018459  10/2009
EP  2710884  3/2014
(Continued)

OTHER PUBLICATIONS

Extended European Search Report for corresponding EP Application No. 16154221.2-1655, dated Jan. 17, 2017.

*Primary Examiner* — Diane I Lee
*Assistant Examiner* — Naomi M Wolford
(74) *Attorney, Agent, or Firm* — Mori & Ward, LLP

(57) ABSTRACT

A movable lighting apparatus for raising natural lawn grass includes a frame, main support legs supporting the frame, and casters attached to the lower ends of the main support legs. A movable beam is provided such that it can be advanced and retracted relative to the frame in a left-right direction. A stationary beam is fixed to the frame. A sub-support leg is provided at an advancement direction forward end portion of the movable beam so as to support a distal end of the movable beam when the movable beam is advanced. A caster is attached to the lower end of the sub-support leg. LED lamps are attached to the movable beam and the stationary beam. When the movable beam is retracted, the lower end of the caster of the sub-support leg is moved to a position above the lower ends of the casters of the main support legs.

12 Claims, 11 Drawing Sheets

(51) Int. Cl.
*A01G 20/30* (2018.01)
*F21Y 115/10* (2016.01)

(58) Field of Classification Search
CPC ....... F21W 2131/105; F21W 2131/407; A01B 45/00
USPC ...................................... 362/805; 47/58.1 LS
See application file for complete search history.

(56) References Cited

FOREIGN PATENT DOCUMENTS

GB          2350997        12/2000
JP          07-79645        3/1995

* cited by examiner

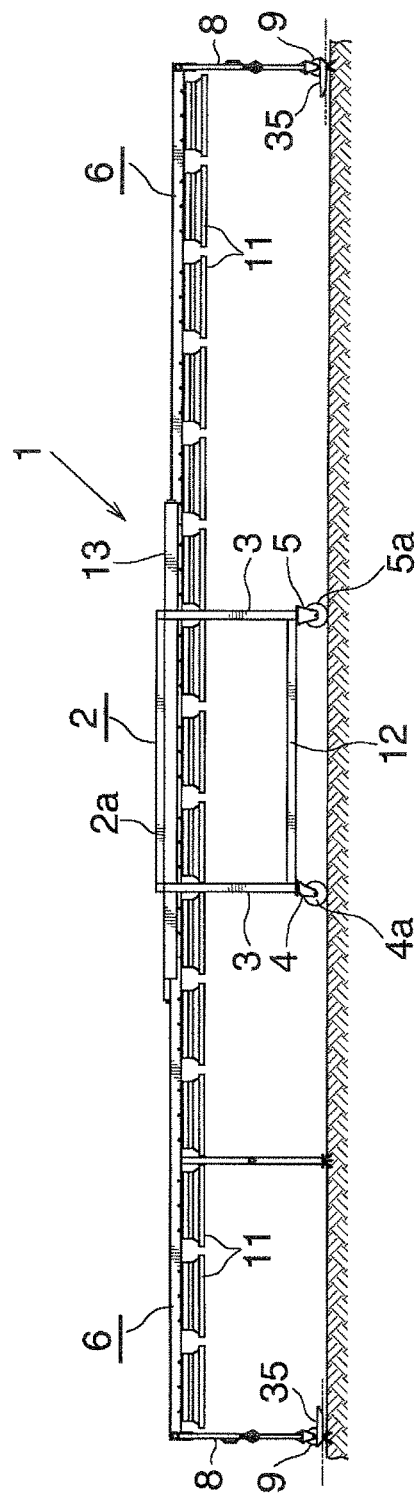
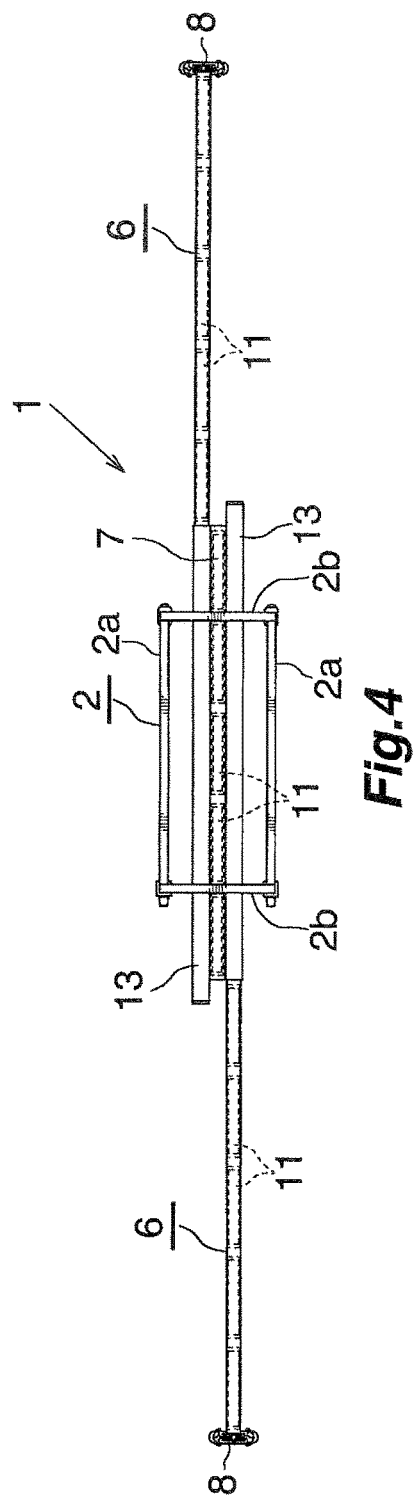

LIGHTING APPARATUS FOR RAISING NATURAL LAWN GRASS

BACKGROUND OF THE INVENTION

The present invention relates to a lighting apparatus for raising natural lawn grass which is used for maintenance of natural lawn grass planted in the ground such as a soccer stadium, a rugby pitch, an athletic field, a tennis court, a baseball field, or a golf course.

Herein and in the appended claims, the upper side, lower side, left-hand side, and right-hand side in FIGS. 1 and 3 will be referred to as "upper," "lower," "left," and "right," respectively. The lower side in FIGS. 2 and 4 (the right side in FIGS. 5 to 7) will be referred to as "front," and the side opposite thereto will be referred to as "rear."

Conventionally, the maintenance of natural lawn grass planted in the ground of the above-described field or the like has been typically performed by naturally raising the natural lawn grass by means of sunlight during recovery periods. However, raising of natural lawn grass by means of sunlight has a problem of being time consuming. In addition, in the case where a structure such as stands or a roof is present, it is impossible to avoid formation of a region which is in the shade over a long period of time. Therefore, there has been a problem in that the growth of natural lawn grass is delayed in an area where the natural lawn grass receives little sunshine, and the growth of the natural lawn grass varies between an area where the natural lawn grass receives a lot of sunshine and an area where the natural lawn grass does not receive a lot of sunshine.

An apparatus which overcomes such a drawback has been proposed (see US2001/0035468 A1). In order to accelerate the growth of natural lawn grass of the above-described field or the like and suppress variation in growth thereof, the proposed apparatus emits or radiates artificial light onto the natural lawn grass when the natural lawn grass is to be recovered.

The apparatus disclosed in the US publication includes a horizontal frame having a rectangular shape as viewed from above; four support legs projecting downward from the four corners of the frame and supporting the frame; casters attached to the lower ends of the support legs and having wheels which rotate in the same direction and whose orientations are fixed; a plurality of stationary beams for lamp attachment which are fixedly provided on the frame; and a plurality of lamps attached to the stationary beams for lamp attachment. Artificial light is radiated onto natural lawn grass from the lamps attached to the stationary beams for lamp attachment. In the apparatus disclosed in the US publication, when the natural lawn grass is not required to be irradiated with artificial light, the apparatus is stored in a shed, and only when the natural lawn grass must be irradiated with artificial light, a required number of the apparatuses corresponding to the size of the ground are disposed above the natural lawn grass for use. Therefore, the apparatus is moved between the shed and a location on the natural lawn grass by making use of the casters at the lower ends of the support legs.

However, in the case where the apparatus disclosed in the US publication is used for raising the natural lawn grass of a large-scale ground such as the ground of a soccer stadium, the following problems arise. In order to decrease the number of the apparatuses, the size of each apparatus must be increased and the shed must have a large storage space. In addition, an operation of moving each apparatus is troublesome. When the size of each apparatus is reduced, a larger number of the apparatuses become necessary, and movement of the larger number of the apparatuses needs much labor and time.

SUMMARY OF THE INVENTION

An object of the present invention is to solve the above-described problems and provide a lighting apparatus for raising natural lawn grass which can uniformly accelerate the growth of natural lawn grass of a large-scale ground using a smaller number of the apparatuses as compared with the apparatus disclosed in the above-mentioned US publication, which can decrease a storage space necessary for storing the apparatus, and which can be moved easily.

A lighting apparatus for raising natural lawn grass according to the present invention comprises a frame; three or more main support legs for supporting the frame; at least one movable beam for lamp attachment whose longitudinal direction coincides with a left-right direction and which can be advanced and retracted in the longitudinal direction relative to the frame; at least one stationary beam for lamp attachment whose longitudinal direction coincides with the left-right direction and which is provided to be stationary relative to the frame; a sub-support leg which is provided at an advancement direction forward end portion of the movable beam and which supports a distal end of the movable beam when the movable beam is advanced; a caster attached to a lower end of the sub-support leg; and lamps attached to the stationary beam and the movable beam, wherein, when the movable beam is retracted, a lower end of the caster of the sub-support leg is moved to a position above lower ends of the main support legs.

BRIEF DESCRIPTION OF THE DRAWINGS

FIG. 3 is a front view showing the overall structure of the lighting apparatus for raising natural lawn grass of FIG. 1 and showing a state in which the movable beam is located at an advanced position;

FIG. 4 is a plan view showing the overall structure of the lighting apparatus for raising natural lawn grass of FIG. 1 and showing the state in which the movable beam is located at the advanced position;

DESCRIPTION OF THE PREFERRED EMBODIMENT

Figure 1:
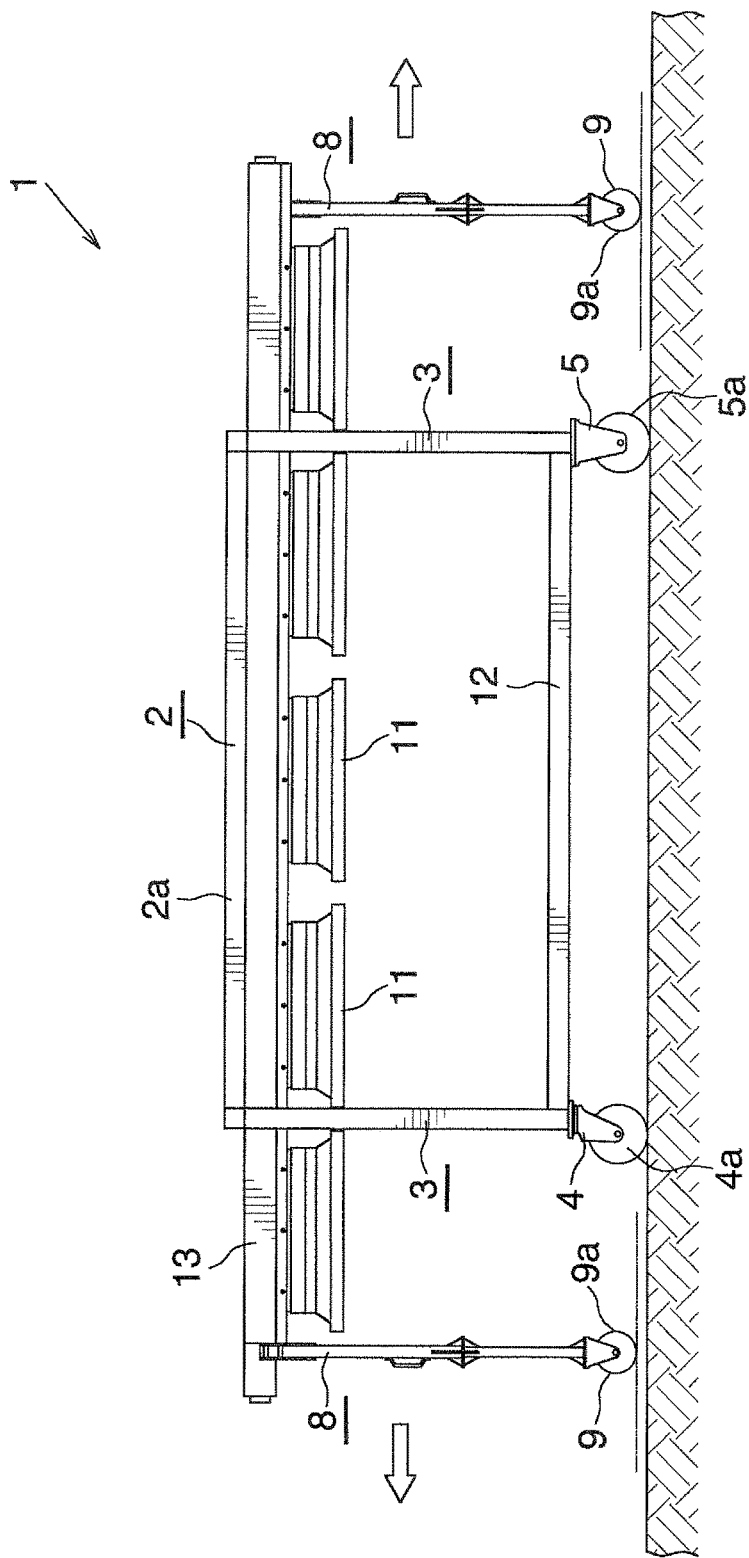
FIG. 1 is a front view showing the overall structure of a lighting apparatus for raising natural lawn grass according to the present invention and showing a state in which a movable beam is located at a retracted position.

An embodiment of the present invention will next be described with reference to the drawings.

FIGS. 1 through 5 show the overall structure of a lighting apparatus for raising natural lawn grass according to the present invention, and FIGS. 6 through 12A, 12B, and 12C show the structure of a main portion thereof.

The term "aluminum" as used in the following description encompasses aluminum alloys in addition to pure aluminum.

As shown in FIGS. 1 through 5, a lighting apparatus for raising natural lawn grass 1 includes a horizontal frame 2 formed of aluminum; three or more (four in the present embodiment) main support legs 3 formed of aluminum and adapted to support the frame 2; casters 4 and 5 attached to the lower ends of the main support legs 3; at least one (two in the present embodiment) movable beam 6 for lamp attachment which is formed of aluminum, whose longitudinal direction coincides with the left-right direction, and which can be advanced and retreated relative to the frame 2; at least one (one in the present embodiment) stationary beam 7 for lamp attachment which is formed of aluminum, whose longitudinal direction coincides with the longitudinal direction of the movable beam 6 (the left-right direction), and which is fixedly provided on the frame 2; a sub-support leg 8 which is formed of aluminum, which is provided at an end of the movable beam 6 located on the forward side in the advancement direction, and which supports the distal end of the movable beam 6 when the movable beam 6 is advanced; casters 9 attached to the lower end of the sub-support leg 8; and a plurality of LED lamps 11 attached to the stationary beam 7 and the movable beam 6. When the movable beam 6 is retracted, the lower ends of the casters 9 of the sub-support leg 8 are located above the lower ends of the casters 4 and 5 of the main support legs 3.

The frame 2 has the shape of a rectangular frame which is elongated in the longitudinal direction of the movable beams 6 and the stationary beam 7 (in the left-right direction) as viewed from above. The frame 2 is composed of a pair of long frame members 2a which are disposed in such a manner that their longitudinal direction coincides with the left-right direction and they are spaced from each other in the front-rear direction; and short frame members 2b which are disposed in such a manner that their longitudinal direction coincides with the front-rear direction and which connect together the left ends and right ends, respectively, of the two long frame members 2a, the left ends and right ends being located on the opposite sides in the longitudinal direction. The main support legs 3 are provided at the four corners of the frame 2 and extend downward therefrom. A cross support 12 is disposed between lower portions of the two main support legs 3 disposed on the front side and is fixed thereto, and another cross support 12 is disposed between lower portions of the two main support legs 3 disposed on the rear side and is fixed thereto. Another cross support 12 is disposed between lower portions of the two main support legs 3 disposed on the left side and is fixed thereto, and another cross support 12 is disposed between lower portions of the two main support legs 3 disposed on the right side and is fixed thereto. The casters attached to the two main support legs 3 provided at one of the left and right ends (the left end in the present embodiment) of the frame 2 are free casters 4 which can freely change the direction or orientation of their wheels 4a. The casters attached to the two main support legs 3 provided at the other end of the frame 2 are fixed casters 5 which have wheels 5a whose direction or orientation is fixed and each of which rotates about a horizontal rotational center line parallel to the front-rear direction.

Two aluminum rails 13 whose longitudinal direction coincides with the left-right direction and which guide the movable beams 6 are disposed on the frame 2 in such a manner that the rails 13 are spaced from each other in the front-rear direction. The rails 13 are fixed to the lower surfaces of the two short frame members 2b of the frame 2 by a proper method such as welding with left and right end portions of the rails 13 projecting from the frame 2. The movable beams 6 move relative to the rails 13 and are guided by the rails 13. The rail 6 on the front side advances toward the left side in FIGS. 1 through 4 and retracts toward the right side in these drawings. Therefore, as to that movable beam 6, an end portion on the left side in these drawings is an advancement direction forward end portion (a retraction direction rear end portion), and an end portion on the opposite side is an advancement direction rear end portion (a retraction direction forward end portion). The rail 6 on the rear side advances toward the right side in FIGS. 1 through 4 and retracts toward the left side in these drawings. Therefore, as to that movable beam 6, an end portion on the right side in these drawings is an advancement direction forward end portion (a retraction direction rear end portion), and an end portion on the opposite side is an advancement direction rear end portion (a retraction direction forward end portion).

As shown in FIGS. 6 through 10, rail-side guide rollers 14 are provided at an end portion of each rail 13 corresponding to the advancement direction forward end portion of the corresponding movable beam 6. The rail-side guide rollers 14 roll along the corresponding movable beam 6 and guide the corresponding movable beam 6. First and second beam-side guide rollers 15 and 16 are provided at the advancement direction rear end portion of each movable beam 6. The first and second beam-side guide rollers 15 and 16 roll along the corresponding rail 13 and guide the corresponding movable beam 6.

Each rail 13 has a pair of vertical side walls 13a provided in such a manner that they are spaced from each other in the front-rear direction; a connection wall 13b connecting upper end portions (upper portions) of the two side walls 13a together; and inward projection walls 13c provided at the lower end portions (lower portions) of the two side walls 13a in such a manner that each inward projection wall 13c projects toward the side wall 13a on the opposite side. Upward facing guide surfaces 17 are provided on the upper surfaces of the two inward projection walls 13c of each rail 13. The first beam-side guide rollers 15 of the corresponding movable beam 6 roll along the upward facing guide surfaces 17. A downward facing guide surface 18 is provide on the lower surface of the connection wall 13b of each rail 13 at a position between the distal ends of the two inward projection walls 13c. The second beam-side guide roller 16 of the corresponding movable beam 6 rolls along the downward facing guide surface 18. The rail-side guide rollers 14 are attached to end portions of the upward facing guide surfaces 17 of each rail 13 corresponding to the advancement direction forward end portion of the corresponding movable beam 6 in such a manner that the rotational center lines of the rail-side guide rollers 14 become parallel to the front-rear direction. Rail-side side guide rollers 19 are attached to end portions of the upward facing guide surfaces 17 of each rail 13 to be located at positions which correspond to the advancement direction forward end portion of the corresponding movable beam 6 and are shifted from the rail-side guide rollers 14 (in the present embodiment, on the rear side of the rail-side guide rollers 14 in the advancement direction of the corresponding movable beam 6) in such a manner that the rotational center lines of the rail-side side guide rollers 19 become parallel to the vertical direction.

Each movable beam 6 has a T-shaped transverse cross section and has a horizontal wall 6a whose widthwise direction coincides with the front-rear direction and a vertical wall 6b which projects downward from a widthwise central portion of the horizontal wall 6a. Downward facing guide surfaces 21 are provided in regions of the lower surface of the horizontal wall 6a of the movable beam 6 which are located on the front and rear sides of the vertical wall 6b. The downward facing guide surfaces 21 are located above and in opposite to the upward facing guide surfaces 17 of the corresponding rail 13. The rail-side guide rollers 14 roll along the corresponding downward facing guide surfaces 21. At the advancement direction rear end portion of each movable beam 6, the first beam-side guide rollers 15 are attached to the lower surfaces of portions of the horizontal wall 6a of the movable beam 6 which are located on the front and rear sides of the vertical wall 6b; i.e., on the downward facing guide surfaces 21, such that their rotational centers become parallel to the front-rear direction and they project downward. The first beam-side guide rollers 15 roll along the upward facing guide surfaces 17 of the corresponding rail 13. At the advancement direction rear end portion of each movable beam 6, the second beam-side guide roller 16 is attached to a portion of the upper surface of the horizontal wall 6a of the movable beam 6, the portion being located at the center thereof in the front-rear direction, such that its rotational center becomes parallel to the front-rear direction and it projects upward. The second beam-side guide roller 16 rolls along the downward facing guide surface 18 of the corresponding rail 13. Two beam-side side guide rollers 22 are attached to front and rear portions of the upper surface of the horizontal wall 6a of each movable beam 6 at positions forward of the second beam-side guide roller 16 in the advancement direction of the movable beam 6 in such a manner that their rotational center lines become parallel to the vertical direction. The beam-side side guide rollers 22 roll along the two side walls 13a of the corresponding rail 13 and guide the movable beam 6. The vertical wall 6b of each movable beam 6 is sandwiched between the two rail-side side guide rollers 19, and the rail-side side guide rollers 19 roll along the opposite side surfaces of the vertical wall 6b and guide the movable beam 6.

When one movable beam 6 is retracted, the advancement direction forward end portion of the movable beam 6 is supported by the corresponding rail 13 through the corresponding rail-side guide rollers 14, and the advancement direction rear end portion of the movable beam 6 is supported by the corresponding rail 13 through the first beam-side guide rollers 15, whereby the lower ends of the casters of the corresponding sub-support leg 8 are positioned above the lower ends of the casters of the main support legs 3. Also, when the movable beam 6 is retracted, a clearance 23 is formed between the downward facing guide surface 18 of the corresponding rail 13 and the corresponding second beam-side guide roller 16.

The vertical wall 6b of each movable beam 6 serves as a lamp attachment portion 24, and its lower portion projects downward from the corresponding rail 13 through a gap which is formed between the distal ends of the two inward projection walls 13c of the rail 13 in such a manner that the gap extends over the entire length of the rail 13 and establishes communication between the inside and outside of the rail 13. A plurality of LED lamps 11 each including an LED package having an LED chip mounted thereon are detachably attached to the portion of the lamp attachment portion 24 projecting downward from the rail 13.

A first stopper 25 is provided at an end portion of each rail 13 corresponding to the advancement direction rear end portion of the movable beam 6. When the movable beam 6 is located at the retracted position, the movable beam 6 comes into contact with the first stopper 25. The first stopper 25 is attached to a support member 26 which extends between the two side walls 13a of the rail 13 and is fixed thereto. Also, second stoppers 27 are provided on the upper surfaces of the inward projection walls 13c of each rail 13 at positions corresponding to the advancement direction forward end portion of the corresponding movable beam 6 in such a manner that the second stoppers 27 are located rearward of the rail-side side guide rollers 19 in the advancement direction of the movable beam 6. When the movable beam 6 is located at the advanced position, the first beam-side guide rollers 15 of the movable beam 6 come into contact with the second stoppers 27. The second stoppers 27 are attached to attachment members 28 fixed to the upper surfaces of the inward projection walls 13c of the rail 13.

The stationary beam 7 has a T-shaped transverse cross section like the movable beams 6. The stationary beam 7 has a horizontal wall 7a whose widthwise direction coincides with the front-rear direction and a vertical wall 7b which projects downward from a widthwise central portion of the horizontal wall 7a. Front and rear side edge portions of the horizontal wall 7a of the stationary beam 7 are fixed to the corresponding side walls 13a of the front and rear rails 13 by a proper method such as welding. As a result, the stationary beam 7 is fixed to the frame 2 through the rails 13. The lower end of the vertical wall 7b of the stationary beam 7 is located at the same vertical position as the lower ends of the vertical walls 6b of the movable beams 6. A plurality of LED lamps 11 each including a LED chip are attached to a lower portion of the vertical wall 7b in such a manner that the LED lamps 11 are located at the same vertical position as the LED lamps 11 attached to the movable beams 6.

Figure 5:
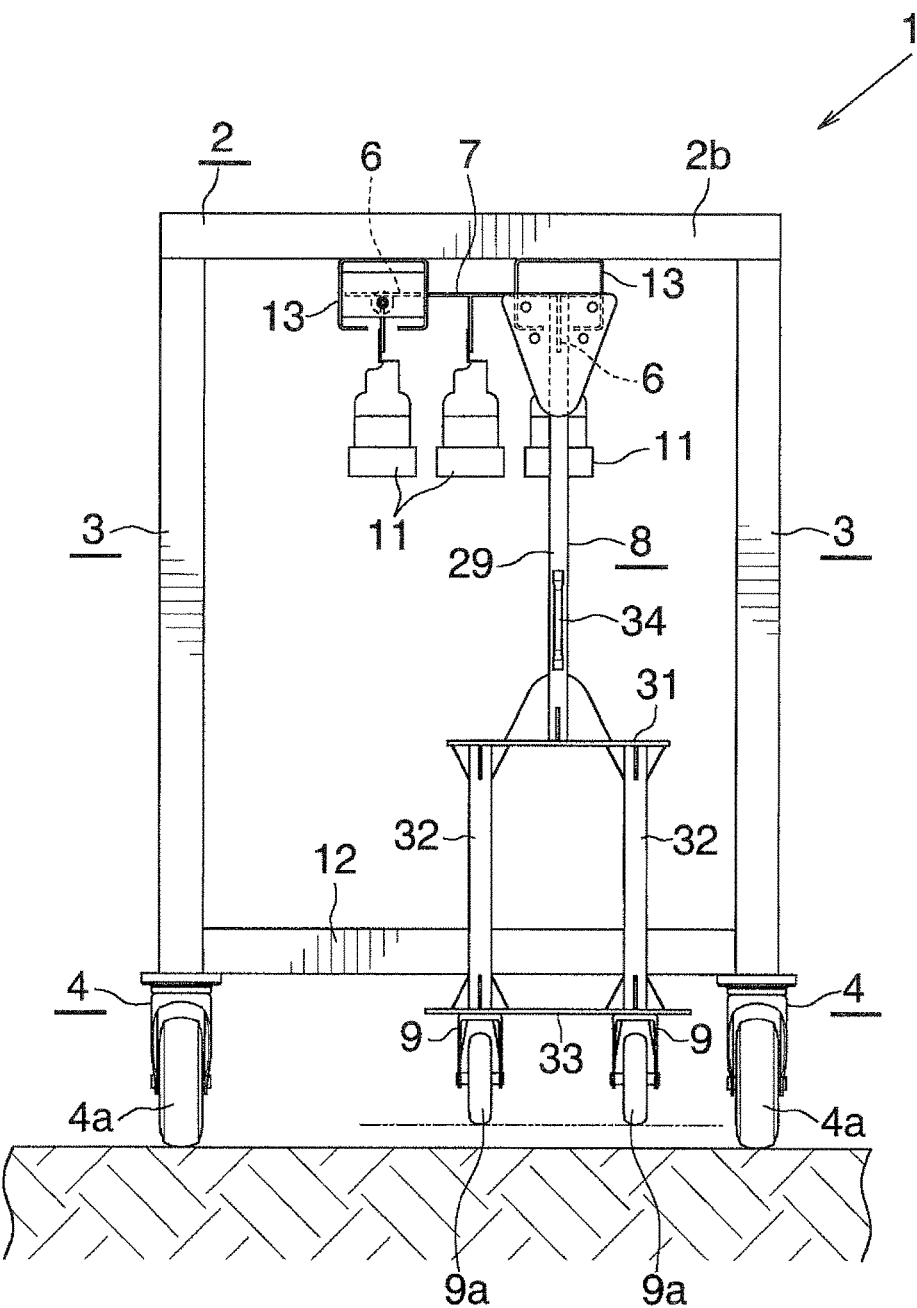
FIG. 5 is a left side view of the lighting apparatus for raising natural lawn grass of FIG. 1 in the state in which the movable beam is located at the retracted position.
Figure 6:
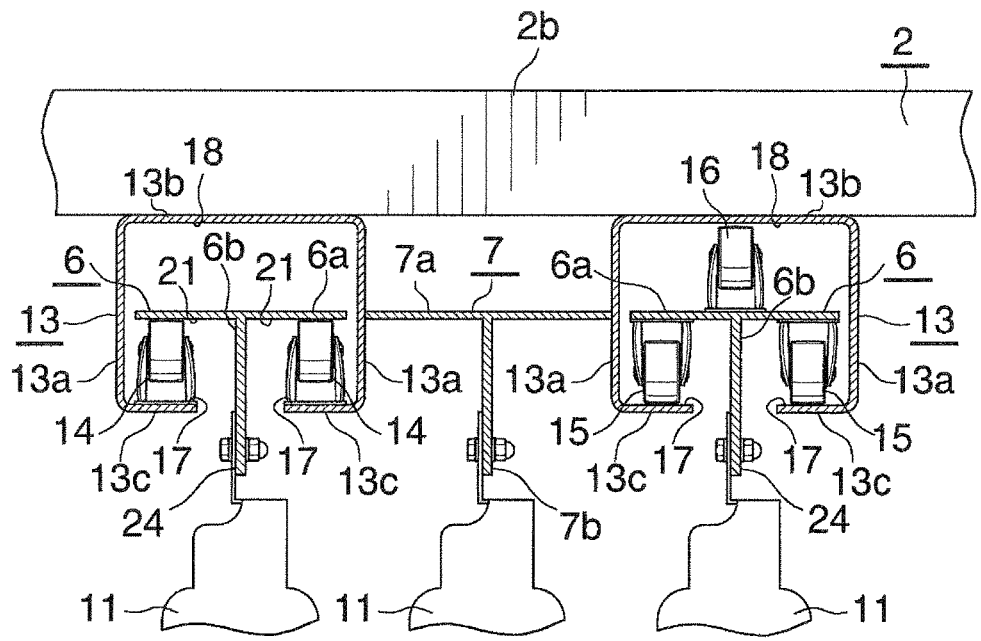
FIG. 6 is an enlarged partial vertical sectional view which is viewed from the left side and which shows the structures of rails, movable beams, a stationary beam, rail-side guide rollers, and two beam-side guide rollers.
Figure 7:
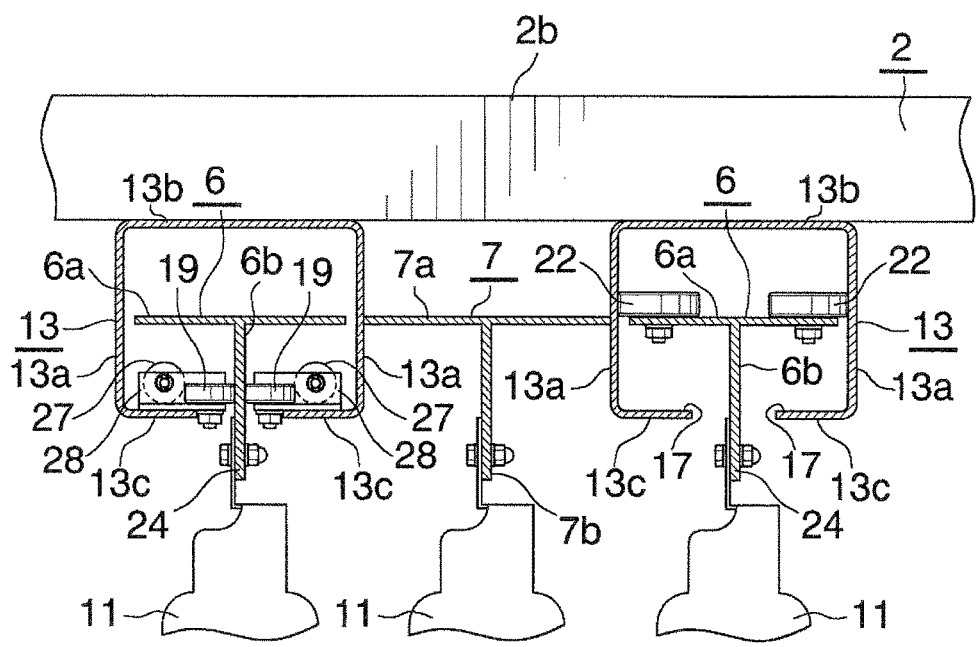
FIG. 7 is an enlarged partial vertical sectional view which is viewed from the left side and which shows the structures of the rails, the movable beams, the stationary beam, rail-side side guide rollers, and beam-side side guide rollers.
Figure 8:
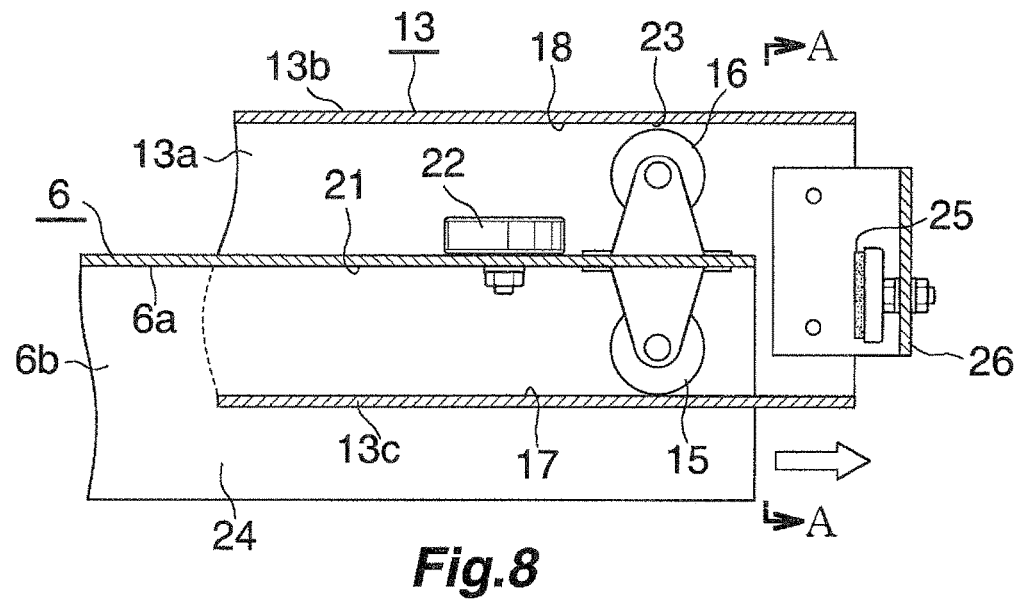
FIG. 8 is an enlarged partial vertical sectional view, as viewed from the front side, of a rear end portion of a movable beam in the advancement direction, the view showing a state immediately before the front-side movable beam reaches the retracted position.
Figure 9:
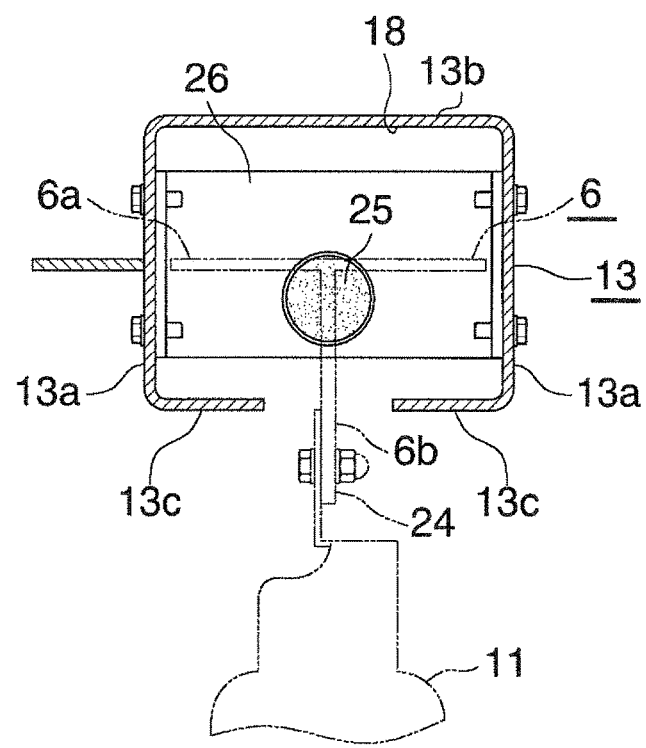
FIG. 9 is a sectional view taken along line A-A of FIG. 8.
Figure 10:
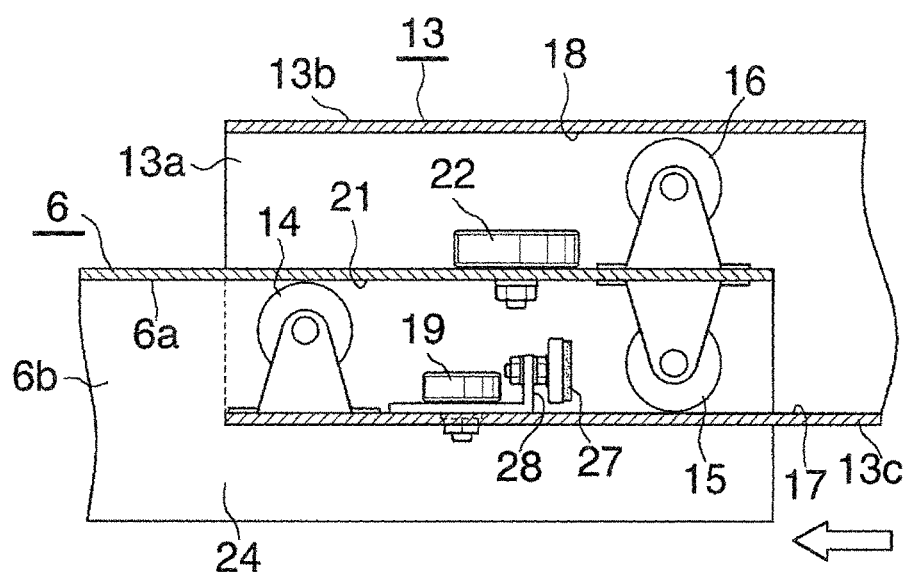
FIG. 10 is an enlarged partial vertical sectional view, as viewed from the front side, of the rear end portion of the movable beam in the advancement direction, the view showing a state immediately before the front-side movable beam reaches the advanced position.
Figure 11:
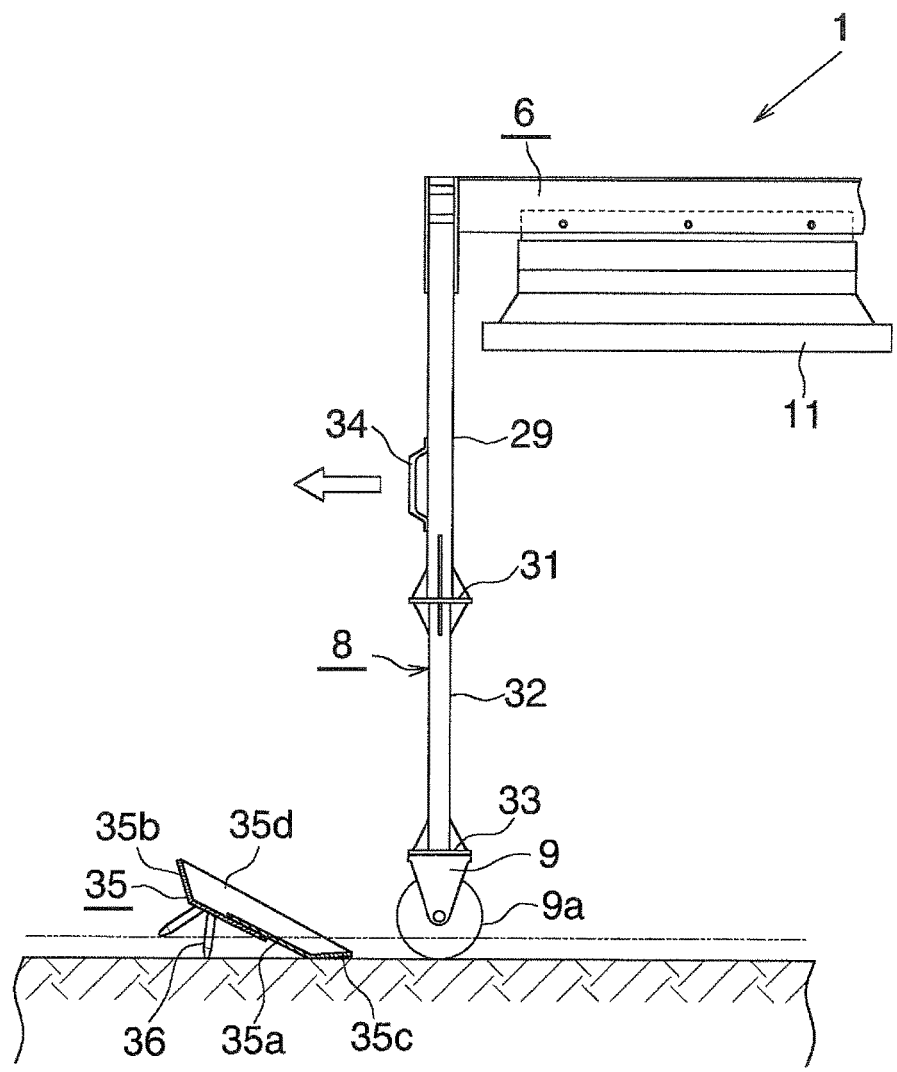
FIG. 11 is a front view of a portion where a sub-support leg is provided, the view showing a state immediately before the front-side movable beam reaches the advanced position.
Figure 12A:
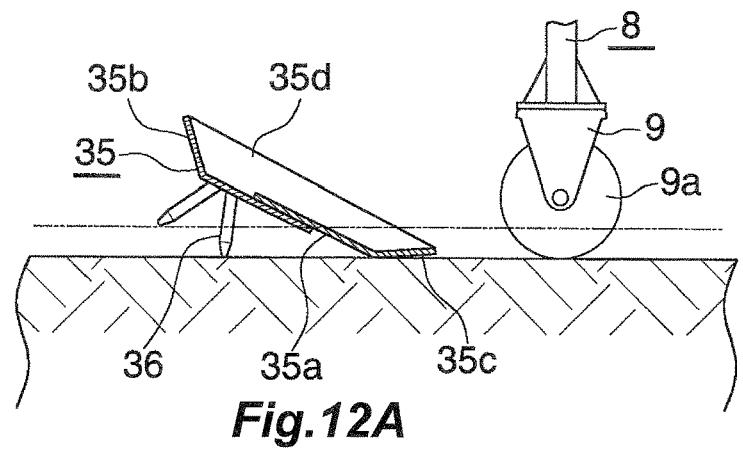
FIGS. 12A to 12C are a set of views showing a method of supporting the wheel of the caster of the sub-support leg of the front-side movable beam by a spacer.
Figure 12B:
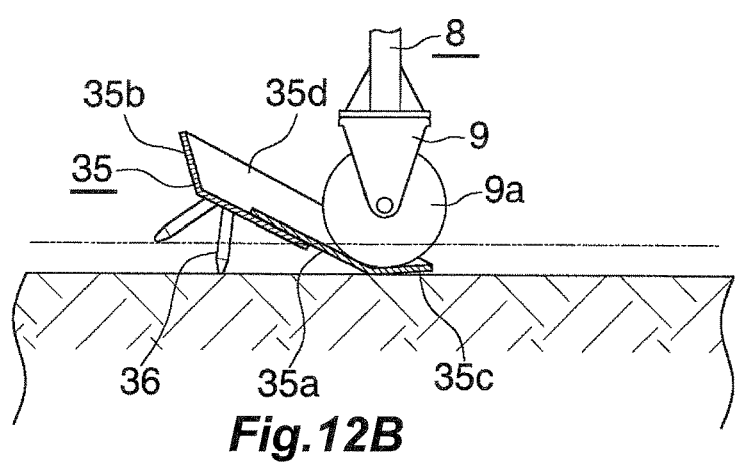
Figure 12C:
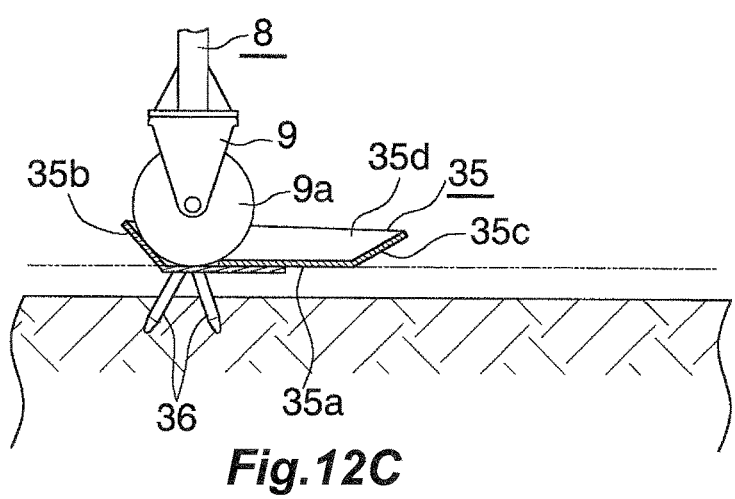
Figure 13:
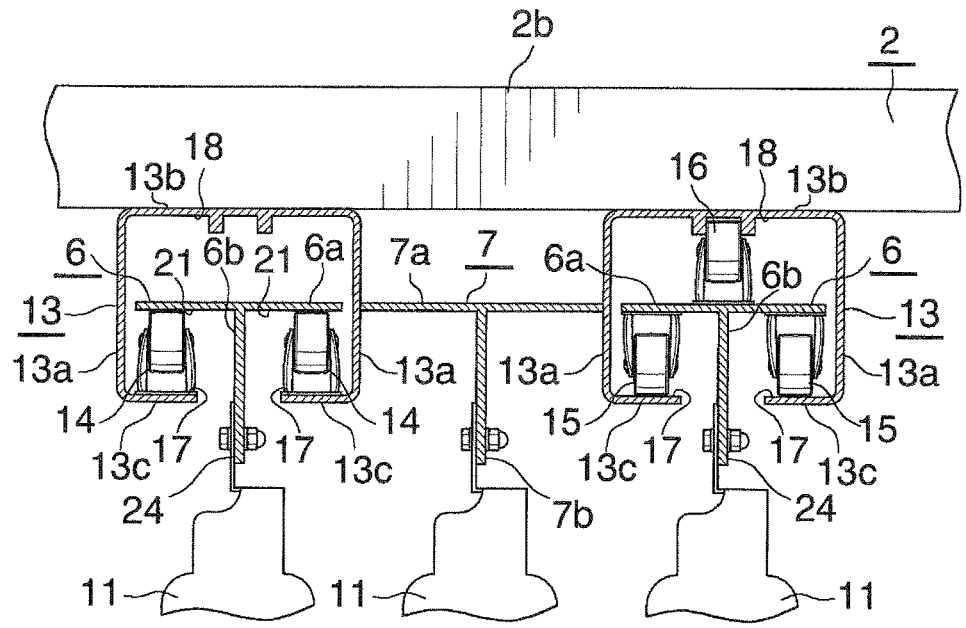
FIG. 13 is a view corresponding to FIG. 6 and showing another embodiment of the lighting apparatus for raising natural lawn grass.
Figure 14:
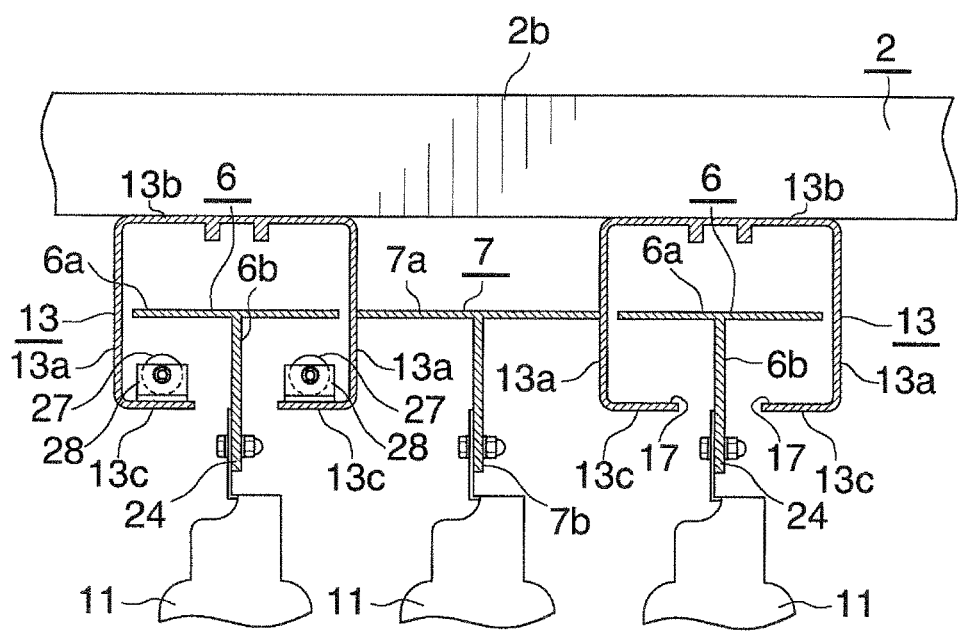
FIG. 14 is a view corresponding to FIG. 7 and showing the lighting apparatus for raising natural lawn grass of FIG. 13.
Figure 15:
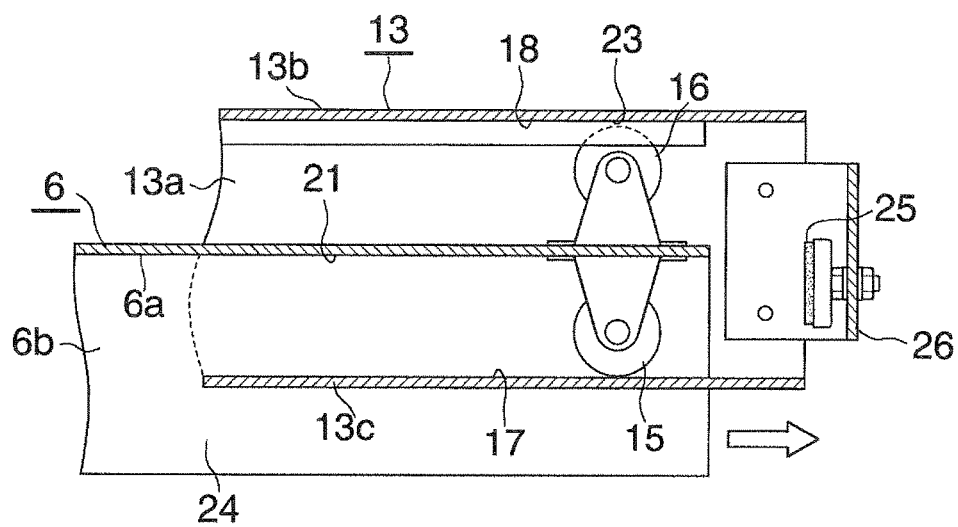
FIG. 15 is a view corresponding to FIG. 8 and showing the lighting apparatus for raising natural lawn grass of FIG. 13.
Figure 16:
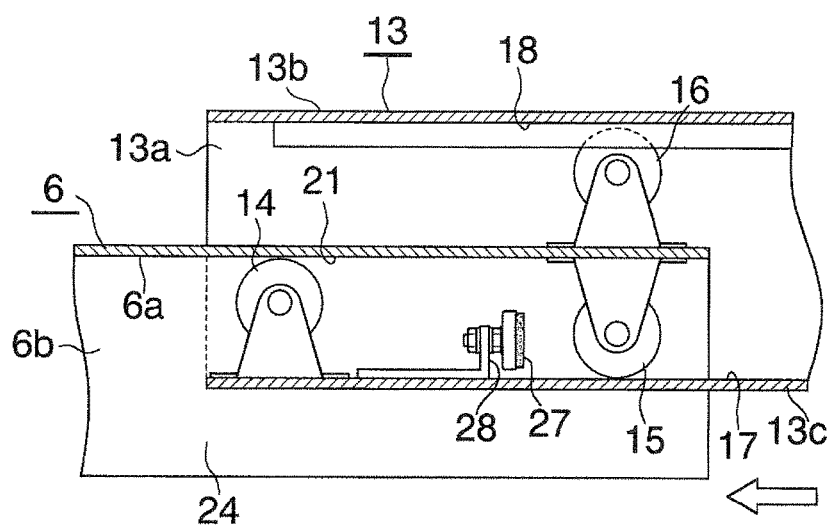
FIG. 16 is a view corresponding to FIG. 10 and showing the lighting apparatus for raising natural lawn grass of FIG. 13.

As shown in FIG. 5, the sub-support leg 8 of each movable beam 6 includes a single first vertical member 29 fixed to the advancement direction forward end portion of the movable beam 6 and extending downward therefrom; a plate-shaped first horizontal member 31 fixed to the lower end of the first vertical member 29 in such a manner that its longitudinal direction coincides with the front-rear direction and the first vertical member 29 is located at the central portion of the first horizontal member 31 in the longitudinal direction thereof; two second vertical members 32 fixed to front and rear end portions of the first horizontal member 31 and extending downward therefrom; and a plate-shaped second horizontal member 33 extending between the lower ends of the two second vertical members 32 and fixed thereto. The casters 9 are attached to front and rear end portions of the lower surface of the second horizontal member 33. Each of the casters 9 has a wheel 9a whose orientation is fixed and which rotates about a horizontal rotational center line parallel to the front-rear direction. Also, a grip 34 is attached to the first vertical member 29. When an operator moves the movable beam 6 between the retracted position and the advanced position, the operator holds the grip 34.

In the case of each sub-support leg 8, the vertical distance between the upper surface of the horizontal wall 6a of the corresponding movable beam 6 and the lower ends of the wheels 9a of the casters 9 is shorter than that in the case of the main support legs 3; i.e., the vertical distances between the upper surfaces of the horizontal walls 6a of the movable beams 6 and the lower ends of the wheels 4a and 5a of the free casters 4 and fixed caster 5.

Notably, although not illustrated in the drawings, a power supply cabtyre cable for supplying electrical power from an external power supply to the LED lamps 11 is preferably disposed above the LED lamps 11. Also, although not illustrated in the drawings, a coating material having a reflectance of 70% or higher, such as a barium sulfate-based or titanium oxide-based white coating material, is preferably applied to portions of the main support legs 3 and the sub-support legs 8 located below the LED lamps 11.

Figure 2:
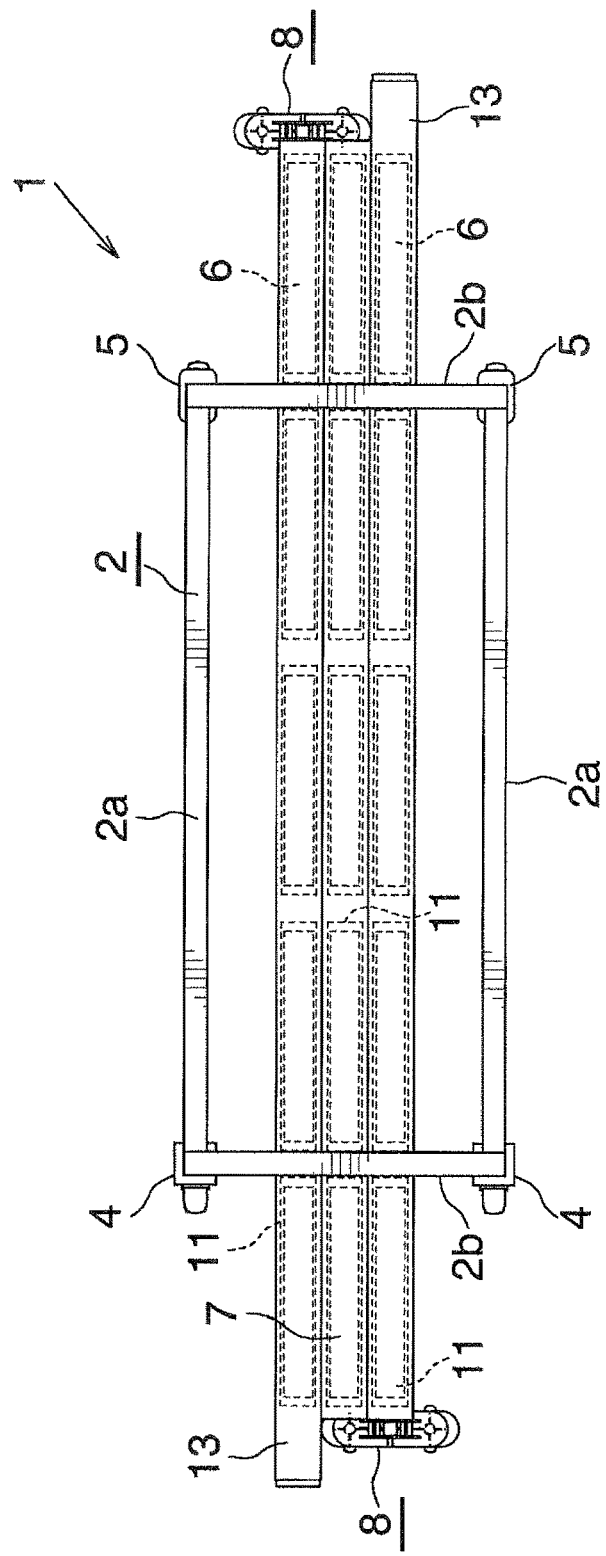
FIG. 2 is a plan view showing the overall structure of the lighting apparatus for raising natural lawn grass of FIG. 1 and showing the state in which the movable beam is located at the retracted position.

Each movable beam 6 moves relative to the frame 2 between the retracted position shown in FIGS. 1 and 2 and the advanced position shown in FIGS. 3 and 4.

When the movable beam 6 is located at the retracted position, the advancement direction forward end portion of the movable beam 6 is supported by the corresponding rail 13 through the rail-side guide rollers 14, and the advancement direction rear end portion of the movable beam 6 is supported by the corresponding rail 13 through the first beam-side guide rollers 15. In this state, the lower ends of the wheels 9a of the casters 9 of the sub-support leg 8 are located (for example, about 50 mm) higher than the lower ends of the wheels 4a and 5a of the free casters 4 and the fixed casters 5 of the main support legs 3, because the vertical distance of the sub-support leg 8 between the upper surface of the horizontal wall 6a of the corresponding movable beam 6 and the lower ends of the wheels 9a of the casters 9 is shorter than that of the main support legs 3; i.e., the vertical distances between the upper surfaces of the horizontal walls 6a of the movable beams 6 and the lower ends of the wheels 4a and 5a of the free casters 4 and fixed caster 5. Also, when the movable beam 6 is retracted, the clearance 23 is formed between the downward facing guide surface 18 of the corresponding rail 13 and the second beam-side guide rollers 16. When the movable beam 6 is located at the advanced position, the clearance 23 allows the movable beam 6 to incline due to the force of gravity so that its advancement direction forward end portion moves downward, and the wheels 9a of the casters 9 of the sub-support leg 8 come into contact with the ground. Also, the advancement direction rear end portion of the movable beam 6 is in contact with the corresponding first stopper 25.

Meanwhile, when the movable beam 6 is located at the advanced position, the clearance 23—which is formed between the downward facing guide surface 18 of the corresponding rail 13 and the second beam-side guide rollers 16 at the retracted position—allows the movable beam 6 to incline due to the force of gravity so that its advancement direction forward end portion moves downward, and the wheels 9a of the casters 9 of the sub-support leg 8 come into contact with the ground through a spacer 35. Accordingly, the advancement direction forward end portion of the movable beam 6 is supported by the sub-support leg 8, and the advancement direction rear end portion thereof is supported by the rail-side guide rollers 14. As shown in FIG. 11 and FIGS. 12A to 12C, the spacer 35 has a dish-like shape and has a bottom wall 35a elongated in the direction in which the movable beam 6 moves, left and right end walls 35b and 35c, and front and rear side walls 35d. A plurality of spikes 36 are provided on an outer end portion (in the left-right direction) of the lower surface of the bottom wall 35a of each spacer 35. Since the spikes 36 bite into the ground surface on which the natural lawn grass is grown, the wheels 9a of the casters 9 of the sub-support leg 8 are prevented from coming into direct contact with the ground surface. As a result, damage to the natural lawn grass is suppressed. Notably, the spacers 35 are not necessarily required.

In the case where the movable beam 6 moves while being guided by the corresponding rail 13, the corresponding rail-side guide rollers 14 roll along the downward facing guide surfaces 21 of the movable beam 6, and the corresponding rail-side side guide rollers 19 roll along the opposite side surfaces of the vertical wall 6b of the movable beam 6. At the same time, the corresponding first beam-side guide rollers 15 roll along the upward facing guide surfaces 17 of the corresponding rail 13, and the corresponding beam-side side guide rollers 22 roll along the inner surfaces of the opposite side walls 13a of the rail 13. Notably, in a state in which the second beam-side guide roller 16 is in contact with the downward facing guide surface 18 of the rail 13, the second beam-side guide roller 16 rolls along the downward facing guide surface 18 of the rail 13.

When not used, the above-described lighting apparatus for raising natural lawn grass is stored in a shed or the like with the movable beams 6 moved to their retracted positions. In this state, since the overall length of the lighting apparatus for raising natural lawn grass 1 becomes shorter as compared with the case where the movable beams 6 are located at their advanced positions, the storage space can be reduced.

In the case where the natural lawn grass of a stadium must be recovered through irradiation with artificial light from the LED lamps 11, with the movable beams 6 located at their retracted positions as in the case of storage, the lighting apparatus for raising natural lawn grass 1 is moved to the ground of the stadium by making use of the free casters 4 and the fixed casters 5 of the main support legs 3 of the frame 2. After a required number of the lighting apparatuses 1 corresponding to the size of the ground are disposed, each movable beam 6 is moved to the advanced position.

Immediately before each movable beam 6 is moved to the advanced position, the spacer 35 for receiving the wheels 9a of the casters 9 of the sub-support leg 8 is disposed on the forward side of the wheels 9a of the casters 9 in the moving direction. The spacer 35 is disposed in such a manner that the end wall 35c located opposite the side where the spikes 36 are provided comes into contact with the ground surface where the natural lawn grass grows.

Immediately before each movable beam 6 is moved to the advanced position, the wheels 9a of the casters 9 of the sub-support leg 8 run onto the end wall 35c of the spacer 35 which is in contact with the ground surface. When the movable beam 6 moves further toward the advanced position, the wheels 9a run onto the bottom wall 35a of the spacer 35. When the wheels 9a reach the end of the bottom wall 35a located on the forward side in the advancement direction of the movable beam 6, the posture of the spacer 35 changes, and the spikes 36 move downward, so that the spikes 36 bite into the ground surface where the natural lawn grass grows. As a result, the wheels 9a of the casters 9 of the sub-support leg 8 are prevented from coming into direct contact with the ground surface, whereby damage to the natural lawn grass is suppressed.

In this state, the natural lawn grass is irradiated with the artificial light from the LED lamps 11 attached to the movable beams 6 and the stationary beam 7. Notably, the vertical positions of the LED lamps 11 are determined such that the density of the photon flux emitted from the lighting apparatus for raising natural lawn grass 1 can be made uniform through use of the minimum number of LED lamps 11 necessary for securing a photon flux density necessary for growth of the natural lawn grass. Depending on the photon flux density of the artificial light to be emitted and the range which must be irradiated with the artificial light, the natural lawn grass may be irradiated with the artificial light in a state in which each of the movable beams 6 is moved to the retracted position or an intermediate position between the advanced position and the retracted position, in addition to a state in which each of the movable beams 6 is moved to the advanced position.

When the irradiation of the natural lawn grass with the artificial light ends, the movable beams 6 are retracted relative to the frame 2, whereby the lower ends of the wheels 9a of the casters 9 of the sub-support legs 8 are moved to positions above the lower ends of the wheels 4a and 5a of the free casters 4 and the fixed casters 5 of the main support legs 3. In this state, each lighting apparatus is moved to the shed by making use of the free casters 4 and the fixed casters 5 of the main support legs 3 of the frame 2.

FIGS. 13 through 16 show another embodiment of the lighting apparatus for raising natural lawn grass.

In the lighting apparatus for raising natural lawn grass of FIGS. 13 through 16, the beam-side side guide rollers 22 are not attached to the upper surface of the horizontal wall 6a of each movable beam 6, and the rail-side side guide rollers 19 are not attached to the upward facing guide surfaces 17 of each rail 13. Instead of the beam-side side guide rollers 22 and the rail-side side guide rollers 19, two guide rails 41 are provided on the downward facing guide surface 18 of each rail 13 in such a manner that they are spaced from each other in the front-rear direction and are integrated with the connection wall 13b. The two guide rails 41 extend in the longitudinal direction of the rail 13 and guide the second beam-side guide roller 16. The left and right ends of each guide rail 41 are located slightly inward of the left and right ends of the corresponding rail 13. The second beam-side guide roller 16 is disposed between the two guide rails 41. Since the second beam-side guide roller 16 is guided by the guide rails 41, each movable beam 6 is prevented from deviating laterally when the movable beam 6 is advanced or retracted relative to the corresponding rail 13.

The present invention comprises the following modes.

1) A lighting apparatus for raising natural lawn grass comprising: a frame; three or more main support legs for supporting the frame; at least one movable beam for lamp attachment whose longitudinal direction coincides with a left-right direction and which can be advanced and retracted in the longitudinal direction relative to the frame; at least one stationary beam for lamp attachment whose longitudinal direction coincides with the left-right direction and which is provided to be stationary relative to the frame; a sub-support leg which is provided at an advancement direction forward end portion of the movable beam and which supports a distal end of the movable beam when the movable beam is advanced; a caster attached to a lower end of the sub-support leg; and lamps attached to the stationary beam and the movable beam, wherein, when the movable beam is retracted, a lower end of the caster of the sub-support leg is moved to a position above lower ends of the main support legs.

2) A lighting apparatus for raising natural lawn grass of par. 1), wherein a rail whose longitudinal direction coincides with the left-right direction and guides the movable beam is attached to the frame; the movable beam is caused to move relative to the rail; a rail-side guide roller which rolls along the movable beam and guides the movable beam is attached to an end portion of the rail corresponding to the advancement direction forward end portion of the movable beam; and a beam-side guide roller which rolls along the rail and guides the movable beam is attached to the advancement direction rear end portion of the movable beam.

3) A lighting apparatus for raising natural lawn grass of par. 2), wherein the rail has an upward facing guide surface and a downward facing guide surface provided above the upward facing guide surface such that the downward facing guide surface is spaced from the upward facing guide surface; the movable beam has a downward facing guide surface provided above the upward facing guide surface of the rail such that the downward facing guide surface faces the upward facing guide surface of the rail; a rail-side guide roller which rolls along the downward facing guide surface of the movable beam is attached to the upward facing guide surface of the rail such that its rotational center line becomes parallel to a front-rear direction; a first beam-side guide roller which rolls along the upward facing guide surface of the rail is attached to the downward facing guide surface of the movable beam such that its rotational center line becomes parallel to the front-rear direction; a second beam-side guide roller which rolls along the downward facing guide surface of the rail is attached to the upper surface of the movable beam such that its rotational center line becomes parallel to the front-rear direction; when the movable beam is retracted, the advancement direction forward end portion of the movable beam is supported by the upward facing guide surface of the rail through the rail-side guide roller and the advancement direction rear end portion of the movable beam is supported by the upward facing guide surface of the rail through the first beam-side guide roller whereby the lower end of the caster of the sub-support leg is moved to a position above the lower ends of the main support legs, and when the movable beam is retracted, a clearance is formed between the downward facing guide surface of the rail and the second beam-side guide roller.

4) A lighting apparatus for raising natural lawn grass of par. 3), wherein the rail has two upward facing guide surfaces spaced from each other in the front-rear direction and the movable beam has two downward facing guide surfaces spaced from each other in the front-rear direction; a gap which establishes communication between the outside and inside of the rail is formed between the two upward facing guide surfaces of the rail such that the gap extends over the entire length of the rail; the movable beam has a lamp attachment portion to which a plurality of lamps are attached; a portion of the lamp attachment portion projects downward from the rail through the gap of the rail; and the plurality of lamps are attached to the portion of the lamp attachment portion projecting downward from the rail.

5) A lighting apparatus for raising natural lawn grass of par. 4), wherein the rail has a pair of vertical side walls spaced from each other in the front-rear direction, a connection wall which connects upper portions of the two side walls together, and inward projection walls which are provided at lower portions of the two side walls such that each inward projection wall projects toward the side wall on the opposite side, the upward facing guide surface is provided on each of upper surfaces of the two inward projection walls, and the lower surface of the connection wall has a downward facing guide surface at a position between distal ends of the two inward projection walls;

the movable beam has a T-shaped transverse cross section and has a horizontal wall and a vertical wall projecting downward from a widthwise central portion of the horizontal wall, a downward facing guide surface is provided on each of portions of the lower surface of the horizontal wall located on the front and rear sides of the vertical wall, and the vertical wall serves as the lamp attachment portion; and the rail-side guide roller is attached to each of the two upward facing guide surfaces of the rail such that the rail-side guide roller projects upward, the first beam-side guide roller is attached to each of the two downward facing guide surfaces of the movable beam such that the first beam-side guide roller projects downward, and the second beam-side guide roller is attached to a portion of the upper surface of the horizontal wall of the movable beam, the portion being located at the center thereof in the front-rear direction, such that the second beam-side guide roller projects upward.

6) A lighting apparatus for raising natural lawn grass of par. 5), comprising two rails which are disposed such that they are spaced from each other in the front-rear direction, two movable beams which are disposed such that they are spaced from each other in the front-rear direction and which are guided by the rails, and a single stationary beam disposed between the two movable beams, wherein the stationary beam has a T-shaped transverse cross section and has a horizontal wall and a vertical wall projecting downward from a widthwise central portion of the horizontal wall; front and rear side edge portions of the horizontal wall of the stationary beam are fixed to the corresponding side walls of the two rails; and the lamps are attached to a lower portion of the vertical wall of the stationary beam.

7) A lighting apparatus for raising natural lawn grass of par. 5) or 6), wherein two rail-side side guide rollers whose rotational center lines are parallel to a vertical direction and which roll along side surfaces of the vertical wall of the movable beam to thereby guide the movable beam are attached to the upper surfaces of the two inward projection walls of the rail to be located at positions which correspond to the advancement direction forward end portion of the movable beam and are shifted from the rail-side guide rollers, and the vertical wall of the movable beam is sandwiched between the two rail-side side guide rollers; and beam-side side guide rollers whose rotational center lines are parallel to the vertical direction and which roll along the two side walls of the rail to thereby guide the movable beam are attached to portions of the upper surface of the horizontal wall of the movable beam near the forward and rear side edges thereof to be located at positions corresponding to the advancement direction rear end portion of the movable beam.

8) A lighting apparatus for raising natural lawn grass of par. 5) or 6), wherein two guide rails which extend in the longitudinal direction of the rail and guide the second beam-side guide roller are provided on the downward facing guide surface of the rail such that the two guide rails are spaced from each other in the front-rear direction, and the second beam-side guide roller is located between the two guide rails.

9) A lighting apparatus for raising natural lawn grass of any one of pars. 1) to 8), wherein a caster is attached to the lower end of each main support leg, and when the movable beam is retracted, the lower end of the caster of the sub-support leg is moved to a position above the lower end of the caster of each main support leg.

10) A lighting apparatus for raising natural lawn grass of any one of pars. 1) to 9), wherein the frame has a rectangular shape as viewed from above, the main support legs are provided at four corners of the frame such that they extend downward therefrom, casters attached to two main support legs located at one end in the advancement direction of the movable beam are free casters which can freely change orientations of their wheels, and casters attached to the remaining two main support legs are fixed casters which have wheels whose orientations are fixed and which rotate about horizontal rotational center lines parallel to the front-rear direction.

11) A lighting apparatus for raising natural lawn grass of any one of pars. 1) to 10), wherein a power supply cabtyre cable for supplying electrical power from an external power supply to the lamps is disposed above the lamps.

12) A lighting apparatus for raising natural lawn grass of any one of pars. 1) to 11), wherein a coating material having a reflectance of 70% or higher is applied to portions located below the lamps.

The lighting apparatus for raising natural lawn grass of any one of pars. 1) through 12) comprises a frame; three or more main support legs for supporting the frame; at least one movable beam for lamp attachment whose longitudinal direction coincides with a left-right direction and which can be advanced and retracted in the longitudinal direction relative to the frame; at least one stationary beam for lamp attachment whose longitudinal direction coincides with the left-right direction and which is provided to be stationary relative to the frame; a sub-support leg which is provided at an advancement direction forward end portion of the movable beam and which supports a distal end of the movable beam when the movable beam is advanced; a caster attached to a lower end of the sub-support leg; and lamps attached to the stationary beam and the movable beam. Accordingly, when natural lawn grass is grown, artificial light can be radiated to the natural lawn grass from the lamps attached to the movable beam and the stationary beam, in a state in which the movable beam is advanced relative to the frame. Accordingly, the growth of the natural lawn grass can be accelerated uniformly. In addition, as compared with the apparatus disclosed in the above-mentioned US publication, the range which can be irradiated with artificial light emitted from a single apparatus becomes wider. Therefore, the number of apparatuses used for growing the natural lawn grass of a large-scale ground can be decreased. As a result, the number of apparatuses to be moved decreases, and the operation of moving the apparatuses can be performed relatively simply. Further, when the natural lawn grass is not required to be irradiated with artificial light, the size of the apparatus can be reduced by retracting the movable beam relative to the frame. Therefore, the operation of moving the individual apparatus can be performed relatively simply, and the storage space of a shed for storing all the apparatuses necessary for growth of the natural lawn grass of a stadium can be decreased.

Also, in a state in which the movable beam is retracted relative to the frame at the time of movement of the apparatus, the lower end of the caster of the sub-support leg is moved to a position above the lower ends of the main support legs. Therefore, advancement and retraction of the movable beam relative to the frame can be performed smoothly, and damage to natural lawn grass can be suppressed. Meanwhile, in a state in which the movable beam is advanced relative to the frame, the apparatus is supported by the main support legs and the sub-support leg. Therefore, when artificial light is radiated to natural lawn grass, the entirety of the apparatus can be stabilized. In addition, since only the lower ends of the main support legs and the wheel of the caster at the lower end of the sub-support leg come into contact with natural lawn grass, the area of contact with the natural lawn grass decreases, and the adverse effect of the contact on the growth of the natural lawn grass is suppressed.

Further, depending on the photon flux density of artificial light to be emitted and the range which must be irradiated with artificial light, artificial light can be radiated in a state in which the movable beams is moved to the retracted position or an intermediate position between the advanced position and the retracted position, in addition to a state in which the movable beams is moved to the advanced position. For example, damage to natural lawn grass tends to become severe, in particular, in front of each goal of a soccer stadium, and when the natural lawn grass of this area is grown, it is effective to increase the photon flux density of the artificial light to be emitted. In such a case, it is preferred to radiate artificial light in a state in which the movable beam is moved to the retracted position.

According to the lighting apparatus for raising natural lawn grass of any one of pars. 2) through 5), the advancement and retraction of the movable beam relative to the frame can be performed smoothly.

According to the lighting apparatus for raising natural lawn grass of par. 6), the stationary beam can be provided relatively simply.

According to the lighting apparatus for raising natural lawn grass of par. 7) or 8), the movable beam is prevented from deviating laterally when the movable beam is advanced or retracted relative to the frame. Therefore, the advancement and retraction of the movable beam relative to the frame can be performed smoothly.

According to the lighting apparatus for raising natural lawn grass of par. 9), in a state in which the movable beam is retracted relative to the frame at the time of movement of the apparatus, the lower end of the caster of the sub-support leg is moved to a position above the lower ends of the casters of the main support legs. Therefore, movement of the apparatus can be performed through use of only the casters at the lower ends of the main support legs, whereby the movement becomes smooth.

According to the lighting apparatus for raising natural lawn grass of par. 10), a change of the direction at the time of movement can be performed relatively easily.

According to the lighting apparatus for raising natural lawn grass of par. 11), the power supply cabtyre cable is prevented from hindering the artificial light radiated from the lamps.

According to the lighting apparatus for raising natural lawn grass of par. 12), a portion of the artificial light radiated from the lamps and impinging directly onto the portions of the apparatus located below the lamps is reflected by the coating material having a high reflectance and impinges onto the natural lawn grass. Therefore, a decrease in irradiation efficiency can be suppressed.

What is claimed is:

1. A lighting apparatus for raising natural lawn grass comprising: a frame; three or more main support legs for supporting the frame; at least one movable beam for lamp attachment whose longitudinal direction coincides with a left-right direction and which can be advanced and retracted in the longitudinal direction relative to the frame; at least one stationary beam for lamp attachment whose longitudinal direction coincides with the left-right direction and which is provided to be stationary relative to the frame; a sub-support leg which is provided at an advancement direction forward end portion of the movable beam and which supports a distal end of the movable beam when the movable beam is advanced; a caster attached to a lower end of the sub-support leg; and lamps attached to the stationary beam and the movable beam, wherein, when the movable beam is retracted, a lower end of the caster of the sub-support leg is moved to a position above lower ends of the main support legs.

2. The lighting apparatus for raising natural lawn grass according to claim 1, wherein a rail whose longitudinal direction coincides with the left-right direction and guides the movable beam is attached to the frame; the movable beam is caused to move relative to the rail; a rail-side guide roller which rolls along the movable beam and guides the movable beam is attached to an end portion of the rail corresponding to the advancement direction forward end portion of the movable beam; and a beam-side guide roller which rolls along the rail and guides the movable beam is attached to the advancement direction rear end portion of the movable beam.

3. The lighting apparatus for raising natural lawn grass according to claim 2, wherein the rail has an upward facing guide surface and a downward facing guide surface provided above the upward facing guide surface such that the downward facing guide surface is spaced from the upward facing guide surface; the movable beam has a downward facing guide surface provided above the upward facing guide surface of the rail such that the downward facing guide surface faces the upward facing guide surface of the rail; a rail-side guide roller which rolls along the downward facing guide surface of the movable beam is attached to the upward facing guide surface of the rail such that the rotational center line of the rail-side guide roller becomes parallel to a front-rear direction; a first beam-side guide roller which rolls along the upward facing guide surface of the rail is attached to the downward facing guide surface of the movable beam such that the rotational center line of the first beam-side guide roller becomes parallel to the front-rear direction; a second beam-side guide roller which rolls along the downward facing guide surface of the rail is attached to the upper surface of the movable beam such that the rotational center line of the second beam-side guide roller becomes parallel to the front-rear direction; when the movable beam is retracted, the advancement direction forward end portion of the movable beam is supported by the upward facing guide surface of the rail through the rail-side guide roller and the advancement direction rear end portion of the movable beam is supported by the upward facing guide surface of the rail through the first beam-side guide roller whereby the lower end of the caster of the sub-support leg is moved to a position above the lower ends of the main support legs, and when the movable beam is retracted, a clearance is formed between the downward facing guide surface of the rail and the second beam-side guide roller.

4. The lighting apparatus for raising natural lawn grass according to claim 3, wherein the rail has two upward facing guide surfaces spaced from each other in the front-rear direction and the movable beam has two downward facing guide surfaces spaced from each other in the front-rear direction; a gap which establishes communication between the outside and inside of the rail is formed between the two upward facing guide surfaces of the rail such that the gap extends over the entire length of the rail; the movable beam has a lamp attachment portion to which a plurality of lamps are attached; a portion of the lamp attachment portion projects downward from the rail through the gap of the rail; and the plurality of lamps are attached to the portion of the lamp attachment portion projecting downward from the rail.

5. The lighting apparatus for raising natural lawn grass according to claim 4, wherein
the rail has a pair of vertical side walls spaced from each other in the front-rear direction, a connection wall which connects upper portions of the two side walls together, and inward projection walls which are provided at lower portions of the two side walls such that each inward projection wall projects toward the side wall on the opposite side, the upward facing guide surface is provided on each of upper surfaces of the two inward projection walls, and the lower surface of the connection wall has a downward facing guide surface at a position between distal ends of the two inward projection walls;
the movable beam has a T-shaped transverse cross section and has a horizontal wall and a vertical wall projecting downward from a widthwise central portion of the horizontal wall, a downward facing guide surface is provided on each of portions of the lower surface of the horizontal wall located on the front and rear sides of the vertical wall, and the vertical wall serves as the lamp attachment portion; and
the rail-side guide roller is attached to each of the two upward facing guide surfaces of the rail such that the rail-side guide roller projects upward, the first beam-side guide roller is attached to each of the two downward facing guide surfaces of the movable beam such that the first beam-side guide roller projects downward, and the second beam-side guide roller is attached to a portion of the upper surface of the horizontal wall of the movable beam, the portion being located at the center thereof in the front-rear direction, such that the second beam-side guide roller projects upward.

6. The lighting apparatus for raising natural lawn grass according to claim 5, comprising two rails which are disposed such that the two rails are spaced from each other in the front-rear direction, two movable beams which are disposed such that the two movable beams are spaced from each other in the front-rear direction and which are guided by the rails, and a single stationary beam disposed between the two movable beams, wherein the stationary beam has a T-shaped transverse cross section and has a horizontal wall and a vertical wall projecting downward from a widthwise central portion of the horizontal wall; front and rear side edge portions of the horizontal wall of the stationary beam are fixed to the corresponding side walls of the two rails; and the lamps are attached to a lower portion of the vertical wall of the stationary beam.

7. The lighting apparatus for raising natural lawn grass according to claim 5, wherein
two rail-side side guide rollers whose rotational center lines are parallel to a vertical direction and which roll along side surfaces of the vertical wall of the movable beam to thereby guide the movable beam are attached to the upper surfaces of the two inward projection walls of the rail to be located at positions which correspond to the advancement direction forward end portion of the movable beam and are shifted from the rail-side guide rollers, and the vertical wall of the movable beam is sandwiched between the two rail-side side guide rollers; and
beam-side side guide rollers whose rotational center lines are parallel to the vertical direction and which roll along the two side walls of the rail to thereby guide the movable beam are attached to portions of the upper surface of the horizontal wall of the movable beam near the forward and rear side edges thereof to be located at positions corresponding to the advancement direction rear end portion of the movable beam.

8. The lighting apparatus for raising natural lawn grass according to claim 5, wherein two guide rails which extend in the longitudinal direction of the rail and guide the second beam-side guide roller are provided on the downward facing guide surface of the rail such that the two guide rails are spaced from each other in the front-rear direction, and the second beam-side guide roller is located between the two guide rails.

9. The lighting apparatus for raising natural lawn grass according to claim 1, wherein a caster is attached to the lower end of each main support leg, and when the movable beam is retracted, the lower end of the caster of the sub-support leg is moved to a position above the lower end of the caster of each main support leg.

10. The lighting apparatus for raising natural lawn grass according to claim 9, wherein the frame has a rectangular shape as viewed from above, the main support legs are provided at four corners of the frame such that the main support legs extend downward therefrom, casters attached to two main support legs located at one end in the advancement direction of the movable beam are free casters which can freely change orientations of their wheels, and casters attached to the remaining two main support legs are fixed casters which have wheels whose orientations are fixed and which rotate about horizontal rotational center lines parallel to the front-rear direction.

11. The lighting apparatus for raising natural lawn grass according to claim 1, wherein a power supply cabtyre cable for supplying electrical power from an external power supply to the lamps is disposed above the lamps.

12. The lighting apparatus for raising natural lawn grass according to claim 1, wherein a coating material having a reflectance of 70% or higher is applied to portions located below the lamps.

* * * * *